US012455907B2

United States Patent
Rafferty et al.

(10) Patent No.: US 12,455,907 B2
(45) Date of Patent: Oct. 28, 2025

(54) CHARACTERIZATION FOR ERRONEOUS ARTIFICIAL INTELLIGENCE OUTPUTS

(71) Applicant: Capital One Services, LLC, McLean, VA (US)

(72) Inventors: Galen Rafferty, Mahomet, IL (US); Samuel Sharpe, Cambridge, MA (US); Brian Barr, Schenectady, NY (US); Jeremy Goodsitt, Champaign, IL (US); Austin Walters, Savoy, IL (US); Kenny Bean, Herndon, VA (US)

(73) Assignee: Capital One Services, LLC, McLean, VA (US)

( * ) Notice: Subject to any disclaimer, the term of this patent is extended or adjusted under 35 U.S.C. 154(b) by 365 days.

(21) Appl. No.: 18/061,689

(22) Filed: Dec. 5, 2022

(65) Prior Publication Data
US 2024/0184813 A1    Jun. 6, 2024

(51) Int. Cl.
*G06F 16/3329*    (2025.01)
*G06F 16/35*    (2025.01)
*G06F 40/56*    (2020.01)

(52) U.S. Cl.
CPC .......... *G06F 16/3329* (2019.01); *G06F 16/35* (2019.01); *G06F 40/56* (2020.01)

(58) Field of Classification Search
CPC ...... G06F 16/3329; G06F 16/35; G06F 40/56; G06F 40/30
See application file for complete search history.

(56) References Cited

U.S. PATENT DOCUMENTS

| | | |
|---|---|---|
| 10,373,259 B1 * | 8/2019 | Konrardy ............... G06Q 40/08 |
| 2017/0372389 A1 * | 12/2017 | Busch .............. G06Q 10/06395 |
| 2022/0044326 A1 * | 2/2022 | Sambhar ................ G06Q 40/06 |
| 2024/0185369 A1 * | 6/2024 | Rafferty ............... G06Q 50/182 |

OTHER PUBLICATIONS

Callahan, Mary Ann, "How Blockchain Can be Used to Secure Sensitive Data Storage" Nov. 7, 2017, pp. 1-5 (https://www.dataversity.net/blockchain-can-used-secure-sensitive-data-storage/) (Year: 2017).*

\* cited by examiner

*Primary Examiner* — Daniel C Washburn
*Assistant Examiner* — Penny L Caudle
(74) *Attorney, Agent, or Firm* — Harrity & Harrity, LLP

(57) ABSTRACT

In some implementations, a device may obtain data indicating reparations issued by an entity that uses artificial intelligence to provide artificial intelligence outputs in connection with users, the reparations being issued for one or more of the artificial intelligence outputs being erroneous. The device may determine, using a machine learning model, an artificial intelligence reparation characterization for the entity. The artificial intelligence reparation characterization determined using the machine learning model may be indicative of an amount of reparations predicted for the entity in connection with uses of artificial intelligence by the entity. The machine learning model may be trained to determine the artificial intelligence reparation characterization based on the data. The device may transmit information indicating the artificial intelligence reparation characterization.

20 Claims, 9 Drawing Sheets

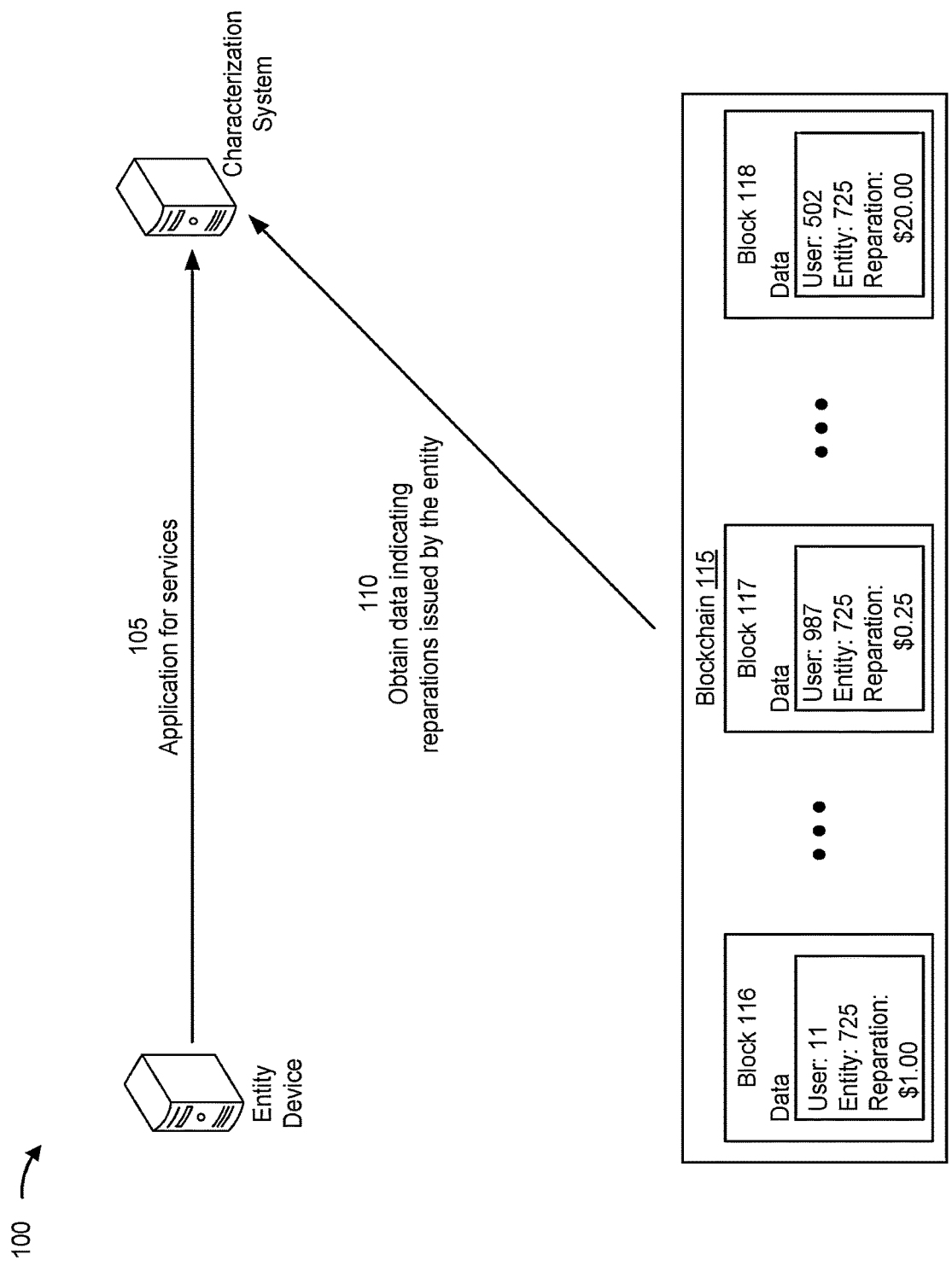

CHARACTERIZATION FOR ERRONEOUS ARTIFICIAL INTELLIGENCE OUTPUTS

BACKGROUND

Artificial intelligence describes different ways that a machine interacts with an environment. Through advanced, human-like intelligence (e.g., provided by software and hardware), an artificial intelligence system may perceive an environment and take actions that maximize a chance of achieving goals. Machine learning is an approach, or a subset, of artificial intelligence, with an emphasis on learning rather than just computer programming. A machine learning system may utilize complex models to analyze a massive amount of data, recognize patterns among the data, and generate an output (e.g., a prediction, a classification, or the like) without requiring a human to program specific instructions.

SUMMARY

Some implementations described herein relate to a system for artificial intelligence reparation characterization for erroneous artificial intelligence outputs. The system may include one or more memories and one or more processors communicatively coupled to the one or more memories. The one or more processors may be configured to obtain data indicating reparations issued by an entity that uses artificial intelligence to provide artificial intelligence outputs in connection with users, the reparations being issued for one or more of the artificial intelligence outputs being erroneous. The one or more processors may be configured to determine, using a machine learning model, an artificial intelligence reparation characterization for the entity. The artificial intelligence reparation characterization determined using the machine learning model may be indicative of an amount of reparations predicted for the entity in connection with uses of artificial intelligence by the entity. The machine learning model may be trained to determine the artificial intelligence reparation characterization based on the data. The one or more processors may be configured to determine, based on the artificial intelligence reparation characterization, information that is to be used to populate a document for the entity. The one or more processors may be configured to generate the document with the information populated in the document.

Some implementations described herein relate to a method of artificial intelligence reparation characterization for erroneous artificial intelligence outputs. The method may include obtaining data indicating reparations issued by an entity that uses artificial intelligence to provide artificial intelligence outputs in connection with users, the reparations being issued for one or more of the artificial intelligence outputs being erroneous. The method may include determining, using a machine learning model, an artificial intelligence reparation characterization for the entity. The artificial intelligence reparation characterization determined using the machine learning model may be indicative of an amount of reparations predicted for the entity in connection with uses of artificial intelligence by the entity. The machine learning model may be trained to determine the artificial intelligence reparation characterization based on the data. The method may include transmitting information indicating the artificial intelligence reparation characterization.

Some implementations described herein relate to a non-transitory computer-readable medium that stores a set of instructions for artificial intelligence reparation characterization for erroneous artificial intelligence outputs. The set of instructions, when executed by one or more processors of a device, may cause the device to receive an application for services indicating an entity category associated with an entity that uses artificial intelligence to provide artificial intelligence outputs in connection with users. The set of instructions, when executed by one or more processors of the device, may cause the device to obtain data, in a blockchain, indicating reparations issued by the entity, the reparations being issued for one or more of the artificial intelligence outputs being erroneous. The set of instructions, when executed by one or more processors of the device, may cause the device to obtain at least one of first unstructured data indicating one or more future entity categories in which the entity is to operate or second unstructured data indicating user sentiment toward the entity. The set of instructions, when executed by one or more processors of the device, may cause the device to perform natural language processing of the at least one of the first unstructured data or the second unstructured data to identify at least one of the one or more future entity categories or the user sentiment. The set of instructions, when executed by one or more processors of the device, may cause the device to determine, using a machine learning model, an artificial intelligence reparation characterization for the entity. The artificial intelligence reparation characterization determined using the machine learning model may be indicative of an amount of reparations predicted for the entity in connection with uses of artificial intelligence by the entity. The machine learning model may be trained to determine the artificial intelligence reparation characterization based on the data and the at least one of the one or more future entity categories or the user sentiment. The set of instructions, when executed by one or more processors of the device, may cause the device to transmit information indicating the artificial intelligence reparation characterization.

BRIEF DESCRIPTION OF THE DRAWINGS

FIGS. 1A-1D are diagrams of an example associated with artificial intelligence reparation characterization for erroneous artificial intelligence outputs, in accordance with some embodiments of the present disclosure.

DETAILED DESCRIPTION

Figure 1B:
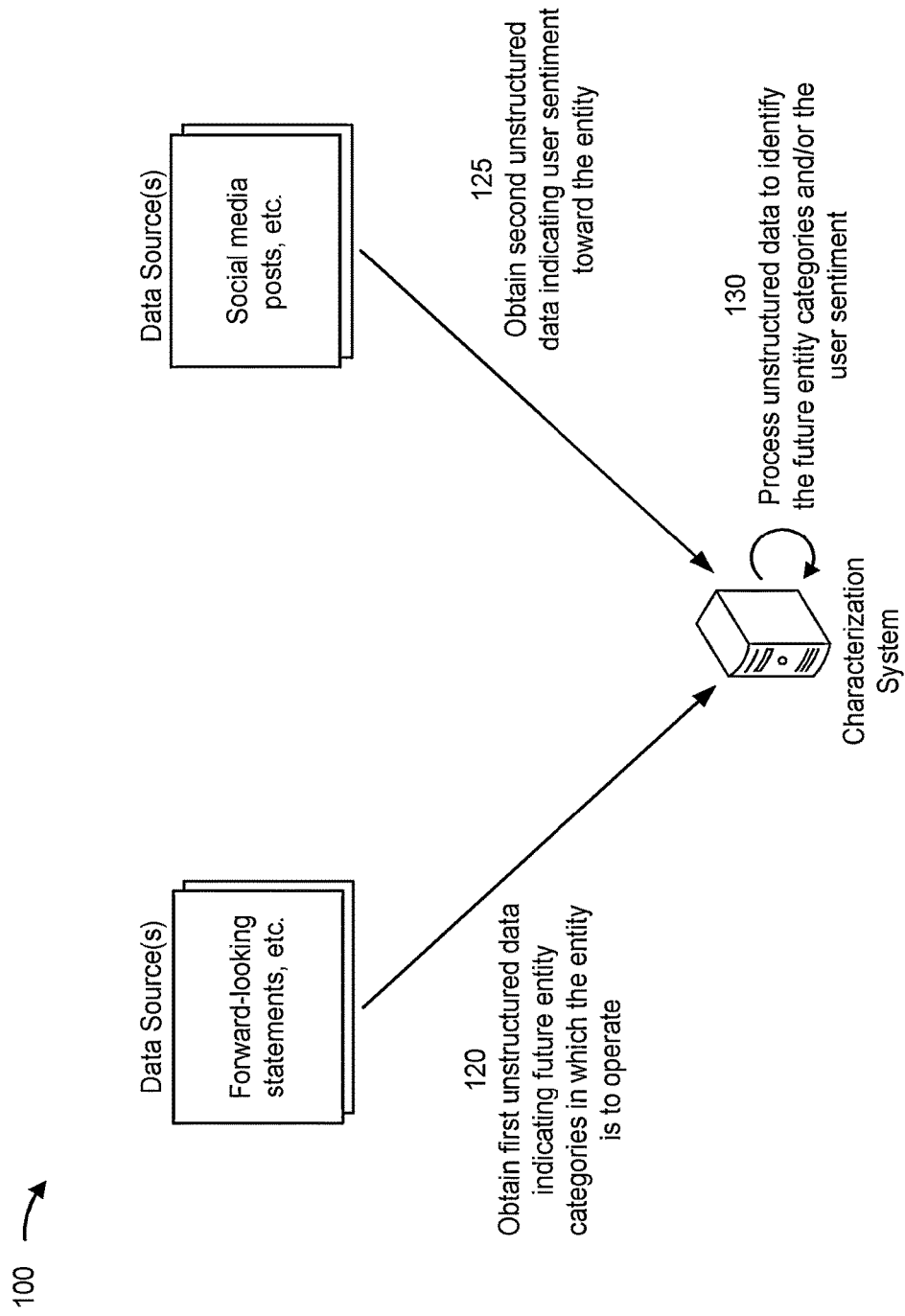

The following detailed description of example implementations refers to the accompanying drawings. The same reference numbers in different drawings may identify the same or similar elements.

Implementations described herein provide a machine learning system that may be configured to utilize blockchain data to accurately determine whether future artificial intelligence (AI)-based outputs of another system have a probability of being erroneous, thereby facilitating improvements to AI and providing efficient allocation and utilization of computing resources that may have otherwise been expended in reaching a less-accurate determination by processing unreliable data from numerous unrelated data sources. The present disclosure addresses problems rooted in computer technology due to AI errors and reparations issued therefor being caused by computer processes.

Various systems may employ AI in reaching decisions for users. For example, a system may use AI to determine a recommendation for a user, to perform facial recognition of a user, to determine an action for an autonomous vehicle of a user, or to determine whether to approve a user's application for a credit card or loan, among numerous other examples. Sometimes, a decision reached using AI may be erroneous (e.g., the decision may be different from a decision that would be reached by a human that is neutral and fully informed), which may be because the programming for the AI has flawed algorithms and/or because information relating to a user and/or an environment, that is used by the AI to reach a decision, is lacking or misleading. In such cases, a system of reparations (which may be referred to as "digital reparations") may include recording complaints of erroneous AI decisions and/or recording adjudications of the complaints as records on a blockchain.

An entity that uses AI in reaching decisions for users may frequently issue reparations to the users as a result of the decisions being erroneous. As described above, characteristics of the users (e.g., locations of the users, ages of the users, occupations of the users, or the like), or a lack of information about the users, may cause the users to be regularly mischaracterized by AI algorithms. An erroneous decision may refer to a recommendation, a classification, a prediction, a clustering, or the like, output by a machine learning model in response to an input that is different from a recommendation, a classification, a prediction, a clustering, or the like, that would have been reached by a human (e.g., the human to which the output is applicable, a domain expert, or the like) using the same input. Thus, systems using AI may allocate and expend significant computing resources (e.g., processor resources, memory resources, or the like) toward reaching such erroneous decisions and/or toward performing automated actions based on the erroneous decisions. Moreover, entities associated with the systems may consume additional computing resources in connection with receiving complaints of erroneous AI decisions, investigating erroneous AI decisions, performing remedial actions for erroneous AI decisions, or the like. In some cases, the entities may attempt to identify a cause of the erroneous AI decisions. However, AI decision-making may commonly use a "black box" approach, where an input to, and an output from, an AI system are known, but the logic used by the system to achieve the output may be unknown. Accordingly, significant computing resources may be expended in an attempt to understand or reverse engineer the logic used by the AI systems.

In addition, due to uncertainty over an extent of reparations that the entity may need to issue, it may be difficult for a party to evaluate whether to enter into a relationship (e.g., a business relationship or a contractual relationship) with the entity. For example, in performing the evaluation, systems of the party may access, download, scrape, reformat, or otherwise process data relating to the entity. However, the data used for evaluating the entity, such as various web pages, financial statements, or the like, may be unsecure, unreliable, and/or susceptible to manipulation. As a result, the party may allocate and expend significant computing resources toward an inaccurate evaluation of the entity. This may further lead to systems of the party generating documents relating to the relationship between the party and the entity that contain inaccurate information or that are otherwise invalid. Thus, the party may allocate and expend significant computing resources toward generating invalid documents.

Some implementations described herein may enable a device to determine an AI reparation characterization for an entity (e.g., indicating the entity's risk level for having to issue reparations) based on erroneous AI outputs of the entity. For example, the device may use a machine learning model to determine the AI reparation characterization. The machine learning model may be trained to determine the AI reparation characterization based on data indicating historical reparations issued by the entity. The data may be in a blockchain, which provides improved reliability and security of the data. Accordingly, the device may evaluate the entity (e.g., according to the AI reparation characterization) with improved efficiency and accuracy using the data, thereby efficiently utilizing computing resources used for entity evaluation. For example, to evaluate the entity, the device may determine a risk category and/or a premium amount for the entity based on the AI reparation characterization. Storage of the data in the blockchain may also eliminate a need for the device to perform extensive processing of data to identify and extract data of interest, thereby conserving significant computing resources. Moreover, the device may use the AI reparation characterization to generate documents that are accurate and valid, thereby efficiently utilizing computing resources used for document generation. For example, a document may include a policy document that is generated with information based on the risk category and/or the premium amount determined for the entity. In some cases, the device may be used for evaluating thousands, or even millions, of entities using AI reparation characterizations and/or for generating thousands, or even millions, of documents, such that significant computing resources may be conserved by the techniques described herein.

FIGS. 1A-1D are diagrams of an example 100 associated with AI reparation characterization for erroneous AI outputs. As shown in FIGS. 1A-1D, example 100 includes an entity device and a characterization system. These devices are described in more detail in connection with FIGS. 4 and 5.

The entity device may be associated with an entity that uses AI to provide outputs in connection with users (e.g., to reach decisions for users). For example, the entity may use AI to determine recommendations of items for users, to determine recommendations of actions based on facial recognition, to determine user-specific prices for goods or services, to determine whether to approve or reject an application for services, to determine traveling directions, and/or to determine actions for autonomous vehicles, among other examples. Thus, there may be a risk that the entity will have to issue reparations for erroneous AI decisions. The characterization system may be associated with a party (e.g., an individual or an entity) that is to evaluate the entity. For example, the party may have to evaluate the entity to determine whether to enter into a relationship with the entity. In some implementations, the party may provide insurance services. For example, the party may provide insurance coverage for reparation payments.

As shown in FIG. 1A, and by reference number 105, the entity device may transmit, and the characterization system may receive, an application for services. The application for services may be associated with the entity. In some implementations, the application for services may be for insurance services for the entity (e.g., for insuring against reparation payments by the entity). The application for services may indicate an entity category (e.g., a merchant category, a business category, or the like) associated with the entity. For example, the entity category may indicate a type of goods or services offered by the entity. Example entity categories may include "restaurant," "book store," "pharmacy," "taxi services," etc.

As shown by reference number 110, the characterization system may obtain (e.g., based on receiving the application for services) data indicating reparations previously issued by the entity (e.g., the reparations were adjudicated for users and/or the reparations were transferred to users, for example, one or more devices of the entity may cause the transferring of funds to users' accounts). For example, the reparations may have been issued by the entity to provide compensation for one or more AI outputs (e.g., erroneous AI decisions), reached by the entity in connection with one or more users, being erroneous. In some implementations, the users may have registered complaints against the entity for erroneous AI outputs, and adjudication of the complaints (e.g., by a neutral third party) may have resulted in one or more awards of reparations to the users. In some implementations, the data obtained by the characterization system may further indicate one or more complaints made against the entity, the complaints indicating that AI outputs reached by the entity are erroneous.

In some implementations, the data obtained by the characterization system may additionally indicate reparations issued by one or more other entities. Here, the entity and the other entities may be associated with the same entity category. In some implementations, the data may indicate entity categories associated with entities, thereby enabling the characterization system to identify the other entities associated with the same entity category as the entity. In some implementations, the characterization system may be provisioned with information that identifies a mapping between entities and entity categories (e.g., merchant category codes), thereby enabling the characterization system to identify the other entities associated with the same entity category as the entity based on the mapping. In some implementations, the characterization system may determine (e.g., infer) an entity category associated with an entity based on the data. For example, the characterization system may determine an entity category associated with an entity based on the entity's name (e.g., "Main Street Diner" may be determined to be associated with a "restaurant" entity category). Additionally, or alternatively, the characterization system may determine an entity category associated with an entity based on characteristics associated with reparations issued by the entity and/or complaints registered against the entity (e.g., a frequency of the reparations and/or complaints, amounts of the reparations, and/or information associated with users that registered the complaints, among other examples). To determine an entity category associated with an entity, the characterization system may use a machine learning model trained to determine the entity category based on the data.

The data indicating the reparations and/or the complaints may be in blockchain 115 (e.g., the characterization system may obtain the data from blockchain 115 via one or more blockchain nodes, as described herein). For example, blockchain 115 may include complaint information for complaints of erroneous AI decisions in connection with one or more users (e.g., a plurality of users) and/or one or more entities (e.g., a plurality of entities), and/or judgment information indicating adjudications of the complaints. The complaint information, for a complaint of a user, may indicate that a decision, reached using AI, is being contested (e.g., that the decision is believed to be erroneous). The complaint information may identify the user, an entity that made the decision using AI, a use case associated with the use of AI, a time/date associated with the use of AI, a result of the use of AI (e.g., the decision in connection with the user), and/or a non-erroneous result (e.g., a non-erroneous decision) that the use of AI should have reached, among other examples. The judgment information, for a judgment made with respect to a complaint of the user, may identify complaint information for the complaint (e.g., by a complaint identifier), whether a reparation is being awarded, and/or an amount of the reparation, among other examples. As shown, blocks 116, 117, and 118 of blockchain 115 may include judgment information associated with the entity (identified in blockchain 115 as entity 725). Relative to another data structure, blockchain 115 may provide improved security and reliability of the complaint information and/or the judgment information, thereby enabling the characterization system to perform an evaluation of the entity that is efficient and accurate.

As shown in FIG. 1B, and by reference number 120, the characterization system may obtain, from one or more data sources, first unstructured data indicating future entity categories in which the entity is to operate. For example, the first unstructured data may include forward-looking statements published by the entity (e.g., in a Form 10-K), news articles, and/or blog posts, among other examples. The future entity categories may include one or more entity categories in which the entity has indicated an intent to commence operations (but has not currently commenced operations). For example, a current entity category associated with the entity may be "pharmacy," and a future entity category in which the entity intends to commence operations may be "online retail" (e.g., which may be identified from the content of a blog post announcing that the entity is to commence online retail). The characterization system may obtain the first unstructured data based on receiving the application for services.

As shown by reference number 125, the characterization system may obtain, from one or more data sources (e.g., which may have one or more data sources in common with the data sources described in connection with reference number 120), second unstructured data indicating user sentiment towards the entity. For example, the second unstructured data may include social media posts, message board posts, blog posts, and/or news articles, among other examples. The user sentiment towards the entity may indicate whether users view the entity favorably or unfavorably and/or a degree by which users view the entity favorably or unfavorably. The characterization system may obtain the second unstructured data based on receiving the application for services. In some implementations, the characterization system may obtain only one of the first unstructured data or the second unstructured data. In some implementations, the characterization system may obtain both of the first unstructured data and the second unstructured data.

As shown by reference number 130, the characterization system may process the first unstructured data to identify the future entity categories and/or the second unstructured data to identify the user sentiment (e.g., as a user sentiment score, a user sentiment classification, or the like). For example, the characterization system may identify the future entity categories and/or the user sentiment by performing natural language processing (NLP) of the first unstructured data and/or the second unstructured data, respectively. In some examples where the first unstructured data and/or the second unstructured data includes images and/or video, the characterization system may additionally or alternatively use one or more computer vision techniques to identify the future entity categories and/or the user sentiment.

Figure 1C:
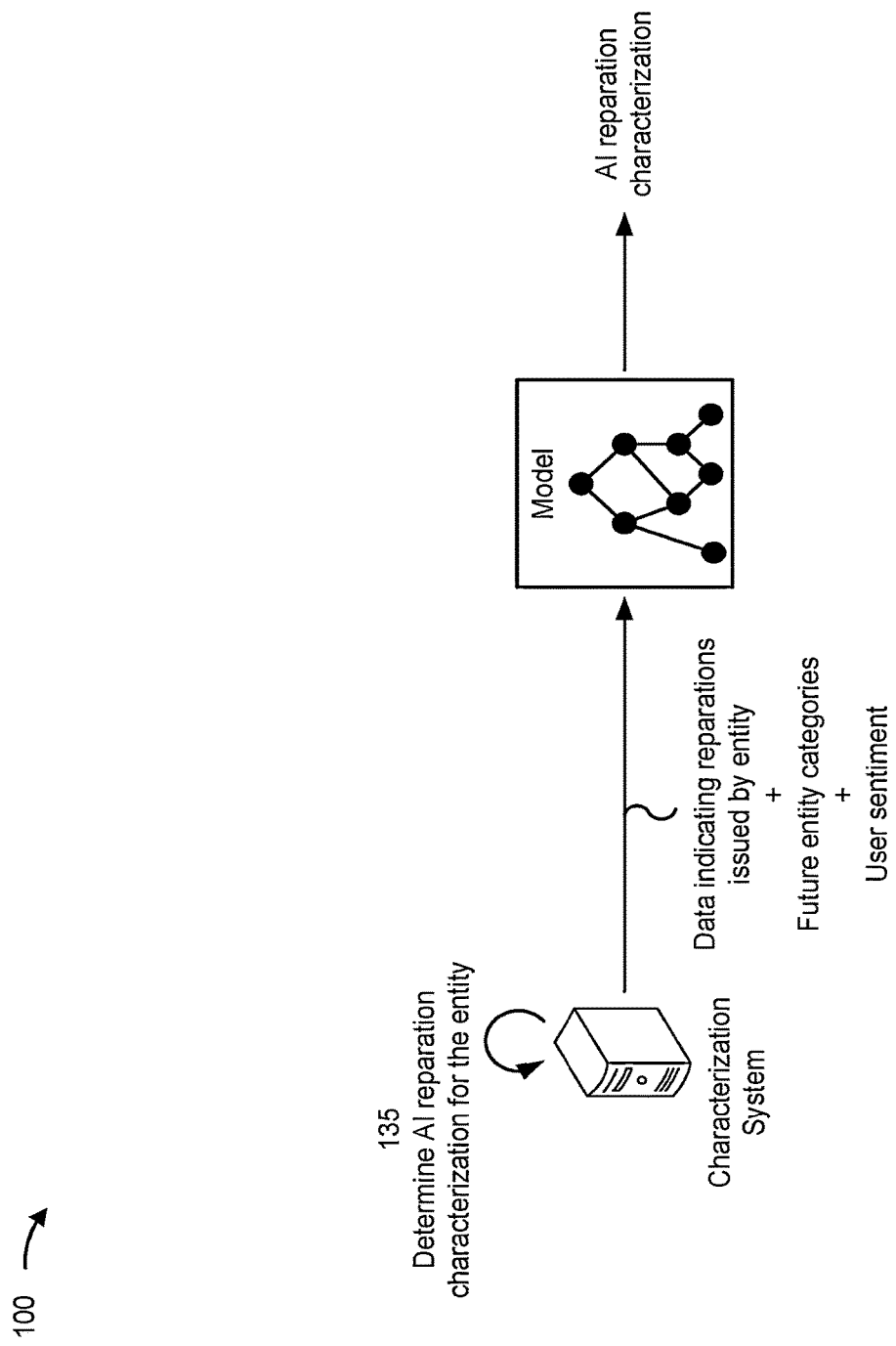

As shown in FIG. 1C, and by reference number 135, the characterization system may determine an AI reparation characterization for the entity. For example, if the entity frequently issues large reparations for erroneous AI decisions, then the AI reparation characterization may indicate that the entity is high risk. The AI reparation characterization may indicate an amount of reparations predicted for the entity in connection with uses of AI by the entity (e.g., a monthly amount, an annual amount, a lifetime amount, or the like). For example, the AI reparation characterization may indicate a risk level for insuring the entity against reparation payments. In some implementations, the AI reparation characterization may include a monetary amount, a score (e.g., where a higher score indicates a higher amount of reparations predicted and/or a higher risk), a classification in a category (e.g., a first category of low risk or low amount of reparations, a second category of high risk or high amount of reparations, and so forth), and/or an insurance premium amount (e.g., where a higher premium indicates a higher amount of reparations predicted and/or a higher risk), among other examples.

The characterization system may determine the AI reparation characterization using a machine learning model. The machine learning model may be based on a deep learning regression technique. The machine learning model may be trained to determine the AI reparation characterization based on the data indicating the reparations and/or the complaints. For example, the machine learning model may be trained to determine the AI reparation characterization based on a frequency at which complaints are registered, a frequency at which reparations are issued, and/or amounts of the reparations, among other examples. As described above, the data may indicate reparations issued by the entity and/or one or more other entities associated with the same, or a similar, entity category as the entity and/or the data may indicate complaints against the entity and/or the one or more other entities. For example, if the data indicates that the entity and/or the other entities frequently issue large reparations, then the machine learning model may determine an AI reparation characterization indicating that a high amount of reparations are predicted for the entity. As another example, if the data indicates that complaints are frequently registered against the entity and/or the other entities, then the machine learning model may determine an AI reparation characterization indicating that a high amount of reparations are predicted for the entity.

In some implementations, the characterization system may additionally, or alternatively, determine the AI reparation characterization based on the future entity categories identified for the entity. For example, based on the future entity categories, the characterization system may obtain additional data (e.g., from blockchain 115) indicating reparations issued by, and/or complaints registered against, one or more entities associated with at least one of the future entity categories. Here, the additional data may be an input to the machine learning model, and the machine learning model may be trained to determine the AI reparation characterization further based on the additional data (e.g., based on the data and the additional data), in a similar manner as described above. As another example, the characterization system may determine an adjustment factor based on the future entity categories. The characterization system may determine the adjustment factor using a different machine learning model (e.g., that is trained to determine the adjustment factor based on the additional data), using a lookup table, or the like. In some implementations, the adjustment factor may be an input to the machine learning model (e.g., the machine learning model may be trained to determine the AI reparation characterization based on the data and the adjustment factor). In some implementations, the characterization system may adjust the AI reparation characterization determined by the machine learning model based on the adjustment factor (e.g., using a formula for adjusting the AI reparation characterization).

In some implementations, the characterization system may additionally, or alternatively, determine the AI reparation characterization based on the user sentiment identified for the entity. For example, information indicating the user sentiment may be an input to the machine learning model, and the machine learning model may be trained to determine the AI reparation characterization further based on the information indicating the user sentiment (e.g., based on the data and the information indicating the user sentiment). In particular, the machine learning model may determine an AI reparation characterization indicating a higher amount of reparations if there is an unfavorable user sentiment towards the entity. As another example, the characterization system may determine an adjustment factor based on the user sentiment. The characterization system may determine the adjustment factor using a different machine learning model (e.g., that is trained to determine the adjustment factor based on information indicating the user sentiment), using a lookup table, or the like. In some implementations, the adjustment factor may be an input to the machine learning model (e.g., the machine learning model may be trained to determine the AI reparation characterization based on the data and the adjustment factor). In some implementations, the characterization system may adjust the AI reparation characterization determined by the machine learning model based on the adjustment factor (e.g., using a formula for adjusting the AI reparation characterization).

In some implementations, the machine learning model may be trained to determine the AI reparation characterization based on the data and at least one of the future entity categories (e.g., the additional data) or the user sentiment (e.g., the information indicating the user sentiment). In some implementations, the machine learning model may be trained to determine the AI reparation characterization based on the data, the future entity categories (e.g., the additional data), and the user sentiment (e.g., the information indicating the user sentiment).

Figure 1D:
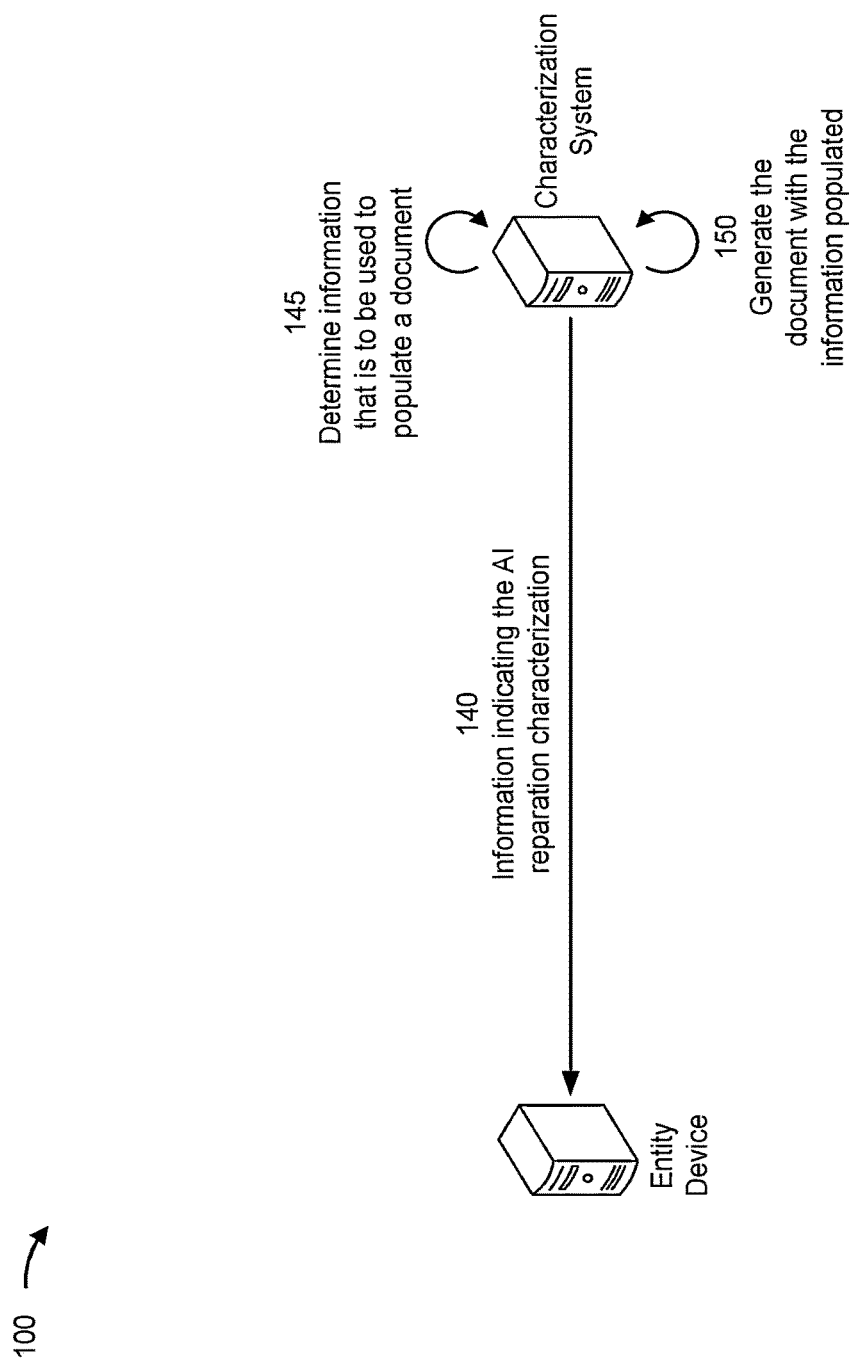

As shown in FIG. 1D, and by reference number 140, the characterization system may transmit, and the entity device may receive, information indicating the AI reparation characterization determined by the characterization system. The information may include a risk category based on the AI reparation characterization (e.g., low risk, moderate risk, high risk, or the like). That is, the risk category may be, or may be derived from, the AI reparation characterization. Additionally, or alternatively, the information may include a premium amount (e.g., an insurance premium amount) based on the AI reparation characterization. That is, the premium amount may be, or may be derived from, the AI reparation characterization. Additionally, or alternatively, the information may include an indication of an approval or a rejection of the application for services. That is, the indication may be, or may be derived from, the AI reparation characterization. For example, if the AI reparation characterization is a first AI reparation characterization (e.g., a first classification, a first score above a threshold, a first premium amount above a threshold, or the like), then the indication may be a first indication (e.g., a rejection), and if the AI reparation characterization is a second AI reparation characterization (e.g., a second classification, a second score below a threshold, a second premium amount below a threshold, or the like), then the indication may be a second indication (e.g., an approval).

As shown by reference number 145, the characterization system may determine, based on the AI reparation characterization, information that is to be used to populate a document for the entity. That is, the information may be, or may be derived from, the AI reparation characterization. The document may be a policy document for an insurance policy. The information may include a premium amount and/or blocks of text (e.g., clauses for a contract or policy document). In some implementations, the information for populating the document may be text indicating an approval or a rejection of the application for services. For example, if the AI reparation characterization of the entity indicates that the entity is high risk, then the document may include a high premium amount, first blocks of text (e.g., indicating relatively strict conditions), and/or an indication of a rejection. As another example, if the AI reparation characterization of the entity indicates that the entity is low risk, then the document may include a low premium amount, second blocks of text (e.g., indicating relatively lenient conditions), and/or an indication of approval.

As shown by reference number 150, the characterization system may generate the document with the information populated in the document. For example, generating the document may include generating, or causing generation of, an electronic file (e.g., a word processing file) either locally at the characterization system or at a cloud computing system. In some implementations, the characterization system may cause the generated document to be transmitted (e.g., via email) to the entity device. In some implementations, the characterization system may cause the generated document (e.g., the electronic file) to be printed, or otherwise produced, as a hard copy.

In this way, the characterization system may evaluate the entity (e.g., by the AI reparation characterization) with improved efficiency and accuracy using the data, thereby efficiently utilizing computing resources used for entity evaluation. Moreover, the characterization system may use the AI reparation characterization to generate documents that are accurate and valid, thereby efficiently utilizing computing resources used for document generation.

As indicated above, FIGS. 1A-1D are provided as an example. Other examples may differ from what is described with regard to FIGS. 1A-1D.

Figure 2:
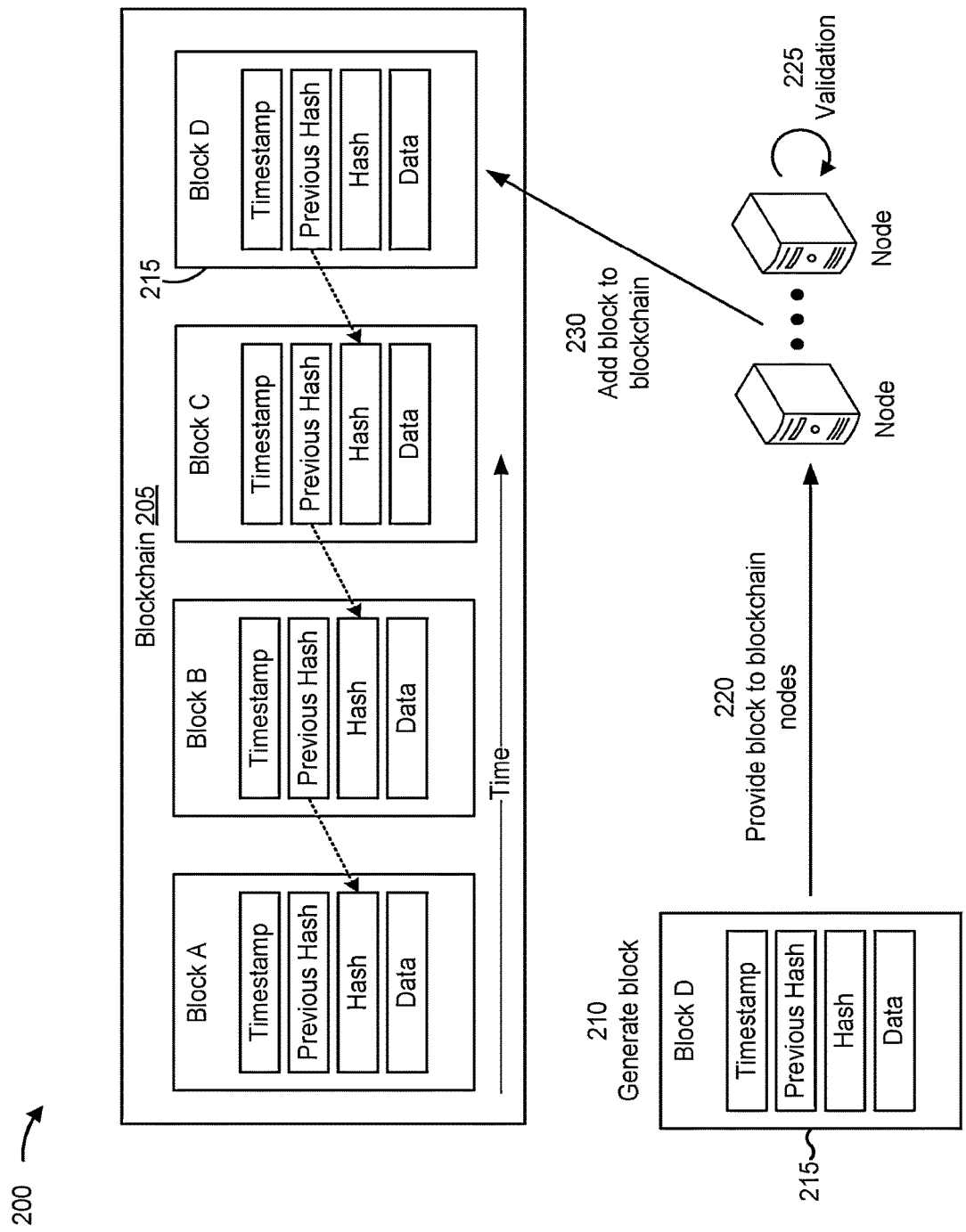
FIG. 2 is a diagram illustrating an example of a blockchain and use thereof, in accordance with some embodiments of the present disclosure.

FIG. 2 is a diagram illustrating an example 200 of a blockchain and use thereof. As shown in FIG. 2, some operations of example 200 may be performed by multiple blockchain nodes. The blockchain nodes may form a blockchain network, and a blockchain 205 may be distributed among the blockchain nodes of the blockchain network. Blockchain 205 may be a distributed ledger, or database, that maintains a list of records, called blocks, that may be linked together to form a chain.

As shown by reference number 210, a procedure for adding to blockchain 205 may begin with generating a block 215. Block 215 may be generated in response to receiving a request (e.g., from the entity device 410, described herein, or another device) to add information, called a transaction, to blockchain 205. In some implementations, block 215 may be generated by a blockchain node.

As shown, each block of blockchain 205, including generated block 215, indicates a timestamp, a previous hash, a hash, and data, among other examples. For block 215, the data may include the transaction that was requested to be added. For example, the transaction may indicate complaint information or judgment information, as described herein. The transaction may be grouped, in block 215, with one or more other transactions that are awaiting publication to blockchain 205. The timestamp, the previous hash, and the hash may define a header of a block. The hash of a block may be a hash representation (e.g., using one or more hashing methods) of the block's data, and the previous hash may be the hash value in the previous block's header. For example, the previous hash in the header of Block B may be the hash value in the header of Block A, and so forth. Thus, the blocks may be chained together by each block referencing the hash value of the previous block. In this way, an altered block may be easily detected and rejected from blockchain 205.

As shown by reference number 220, generated block 215 may be provided (e.g., broadcast) to all blockchain nodes in the blockchain network. As shown by reference number 225, before block 215 is added to blockchain 205, other blockchain nodes may agree that block 215 is valid. That is, the blockchain nodes may reach a consensus on the validity of block 215. To validate block 215, the blockchain nodes may utilize one or more consensus techniques, which may utilize a proof of work (PoW) algorithm, a proof of stake (PoS) algorithm, a delegated proof of stake (DPoS) algorithm, and/or a practical Byzantine fault tolerance (PBFT) algorithm, among other examples. As shown by reference number 230, once validated, the blockchain nodes may add block 215 to their respective copies of blockchain 205.

As indicated above, FIG. 2 is provided as an example. Other examples may differ from what is described in connection with FIG. 2.

Figure 3:
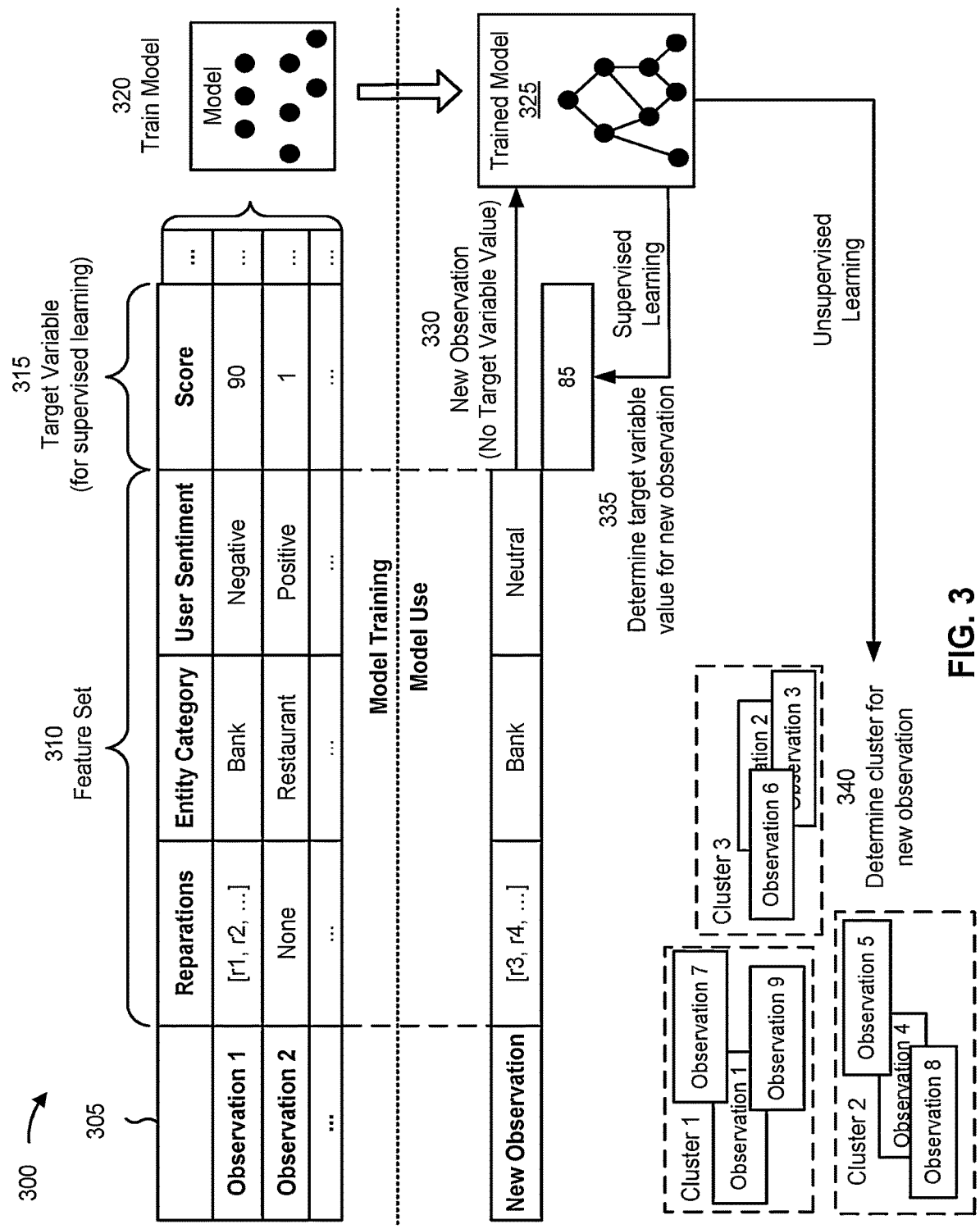
FIG. 3 is a diagram illustrating an example of training and using a machine learning model in connection with artificial intelligence reparation characterization for erroneous artificial intelligence outputs, in accordance with some embodiments of the present disclosure.

FIG. 3 is a diagram illustrating an example 300 of training and using a machine learning model in connection with AI reparation characterization for erroneous AI outputs. The machine learning model training and usage described herein may be performed using a machine learning system. The machine learning system may include or may be included in a computing device, a server, a cloud computing environment, or the like, such as characterization system 420 described in more detail elsewhere herein.

As shown by reference number 305, a machine learning model may be trained using a set of observations. The set of observations may be obtained from training data (e.g., historical data), such as data gathered during one or more processes described herein. In some implementations, the machine learning system may receive the set of observations (e.g., as input) from characterization system 420 and/or one or more blockchain nodes 430, as described elsewhere herein.

As shown by reference number 310, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from characterization system 420 and/or one or more blockchain nodes 430. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of reparations, a second feature of entity category, a third feature of user sentiment, and so on. As shown, for a first observation, the first feature may have a value of r1, r2, and so forth, representing a set of historical issued reparations, the second feature may have a value of bank, the third feature may have a value of negative, and so on. These features and feature values are provided as examples, and may differ in other examples. For example, the feature set may include one or more of the following features: historical reparations issued by one or more entities indicating a total amount of reparations that were issued (e.g., in a month, in a year, or in another time period), a frequency at which the reparations were issued, an average amount of the reparations, a total amount of the reparations (e.g., in a month, in a year, or in another time period), an amount of each reparation, a use case associated with each reparation, an entity category associated with each reparation; historical complaints registered against one or more entities indicating a total amount of complaints that were registered (e.g., in a month, in a year, or in another time period), a frequency at which complaints were registered, a use case associated with each complaint, an entity category associated with each complaint; an entity category associated with an entity being evaluated; one or more future entity categories associated with the entity; and/or a user sentiment towards the entity; among other examples.

As shown by reference number 315, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 300, the target variable may be a score that is an AI reparation characterization, which has a value of 90 for the first observation (e.g., indicating that a high amount of reparations are predicted). In other examples, the target variable indicating an AI reparation characterization may be a premium amount or a classification in a risk category or a reparation amount category.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 320, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. For example, using a neural network algorithm, the machine learning system may train a machine learning model to output (e.g., at an output layer) an AI reparation characterization based on an input (e.g., at an input layer) of data (e.g., from a blockchain) indicating reparations and/or complaints associated with one or more entities, as described elsewhere herein. In particular, the machine learning system, using the neural network algorithm, may train the machine learning model, using the set of observations from the training data, to derive weights for one or more nodes in the input layer, in the output layer, and/or in one or more hidden layers (e.g., between the input layer and the output layer). Nodes in the input layer may represent features of a feature set of the machine learning model, such as a first node representing historical reparations, a second node representing entity category, a third node representing user sentiment, and so forth. One or more nodes in the output layer may represent output(s) of the machine learning model, such as a node indicating an AI reparation characterization. The weights learned by the machine learning model may facilitate transformation of the input of the machine learning model to the output of the machine learning model. After training, the machine learning system may store the machine learning model as a trained machine learning model 325 to be used to analyze new observations.

As an example, the machine learning system may obtain training data for the set of observations based on historical judgment information and/or complaint information, as described herein. The historical judgment information and/or complaint information may be obtained from a blockchain, as described herein.

As shown by reference number 330, the machine learning system may apply the trained machine learning model 325 to a new observation, such as by receiving a new observation and inputting the new observation to the trained machine learning model 325. As shown, the new observation may include a first feature value of r3, r4, and so forth, representing a set of historical issued reparations, a second feature value of bank, a third feature of neutral, and so on, as an example. The machine learning system may apply the trained machine learning model 325 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 325 may predict a value of 85 for the target variable of a score for the new observation, as shown by reference number 335. Based on this prediction, the machine learning system may provide a recommendation, may provide output for determination of a recommendation, may perform an automated action, and/or may cause an automated action to be performed (e.g., by instructing another device to perform the automated action), among other examples. The recommendation may include, for example, a recommendation to accept or to reject an application for services. The automated action may include, for example, generating a document.

In some implementations, the trained machine learning model 325 may classify (e.g., cluster) the new observation in a cluster, as shown by reference number 340. The observations within a cluster may have a threshold degree of similarity. As an example, the machine learning system may classify the new observation in a first cluster (e.g., high risk), a second cluster (e.g., moderate risk), a third cluster (e.g., low risk), and so forth.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 325 may be re-trained using feedback information. For example, feedback may be provided to the machine learning model. The feedback may be associated with actions performed based on the recommendations provided by the trained machine learning model 325 and/or automated actions performed, or caused, by the trained machine learning model 325. In other words, the recommendations and/or actions output by the trained machine learning model 325 may be used as inputs to re-train the machine learning model (e.g., a feedback loop may be used to train and/or update the machine learning model). For example, the feedback information may include a decision to approve or reject an application for services based on an AI reparation characterization.

In this way, the machine learning system may apply a rigorous and automated process to provide AI reparation characterization for an entity. The machine learning system may enable recognition and/or identification of tens, hundreds, thousands, or millions of features and/or feature values for tens, hundreds, thousands, or millions of observations, thereby increasing accuracy and consistency and reducing delay associated with providing AI reparation characterization relative to requiring computing resources to be allocated for tens, hundreds, or thousands of operators to manually provide AI reparation characterization using the features or feature values.

As indicated above, FIG. 3 is provided as an example. Other examples may differ from what is described in connection with FIG. 3.

Figure 4:
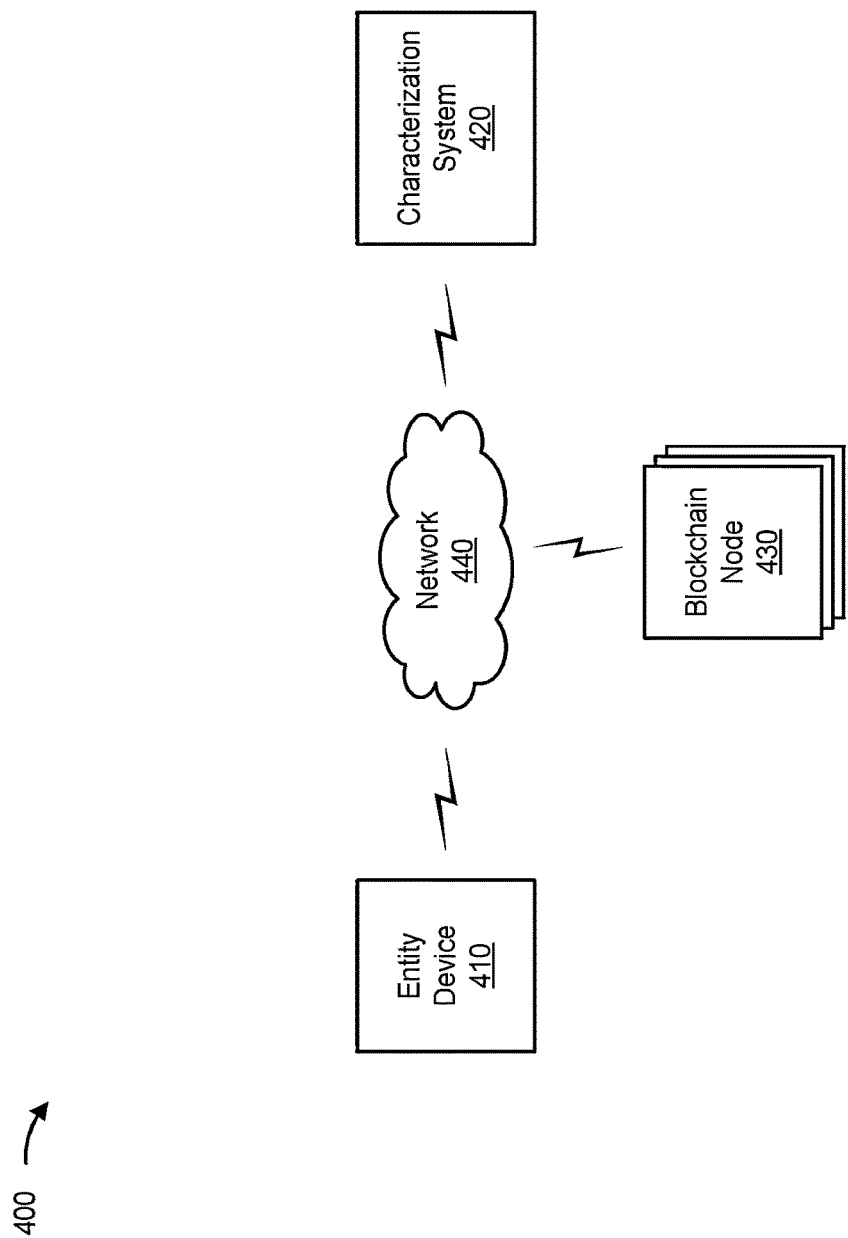
FIG. 4 is a diagram of an example environment in which systems and/or methods described herein may be implemented, in accordance with some embodiments of the present disclosure.

FIG. 4 is a diagram of an example environment 400 in which systems and/or methods described herein may be implemented. As shown in FIG. 4, environment 400 may include an entity device 410, a characterization system 420, one or more blockchain nodes 430, and a network 440. Devices of environment 400 may interconnect via wired connections, wireless connections, or a combination of wired and wireless connections.

The entity device 410 may include one or more devices capable of receiving, generating, storing, processing, and/or providing information associated with AI reparation characterization for erroneous AI outputs, as described elsewhere herein. The entity device 410 may include a communication device and/or a computing device. For example, the entity device 410 may include a wireless communication device, a mobile phone, a user equipment, a laptop computer, a tablet computer, a desktop computer, or a similar type of device.

The characterization system 420 may include one or more devices capable of receiving, generating, storing, processing, providing, and/or routing information associated with AI reparation characterization for erroneous AI outputs, as described elsewhere herein. The characterization system 420 may include a communication device and/or a computing device. For example, the characterization system 420 may include a server, such as an application server, a client server, a web server, a database server, a host server, a proxy server, a virtual server (e.g., executing on computing hardware), or a server in a cloud computing system. In some implementations, the characterization system 420 includes computing hardware used in a cloud computing environment.

The blockchain node 430 may include one or more devices capable of receiving, generating, storing, processing, providing, and/or routing information associated with a blockchain, as described elsewhere herein. The blockchain node 430 may include a communication device and/or a computing device. For example, the blockchain node 430 may include a server or a user device.

The network 440 may include one or more wired and/or wireless networks. For example, the network 440 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 440 enables communication among the devices of environment 400.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
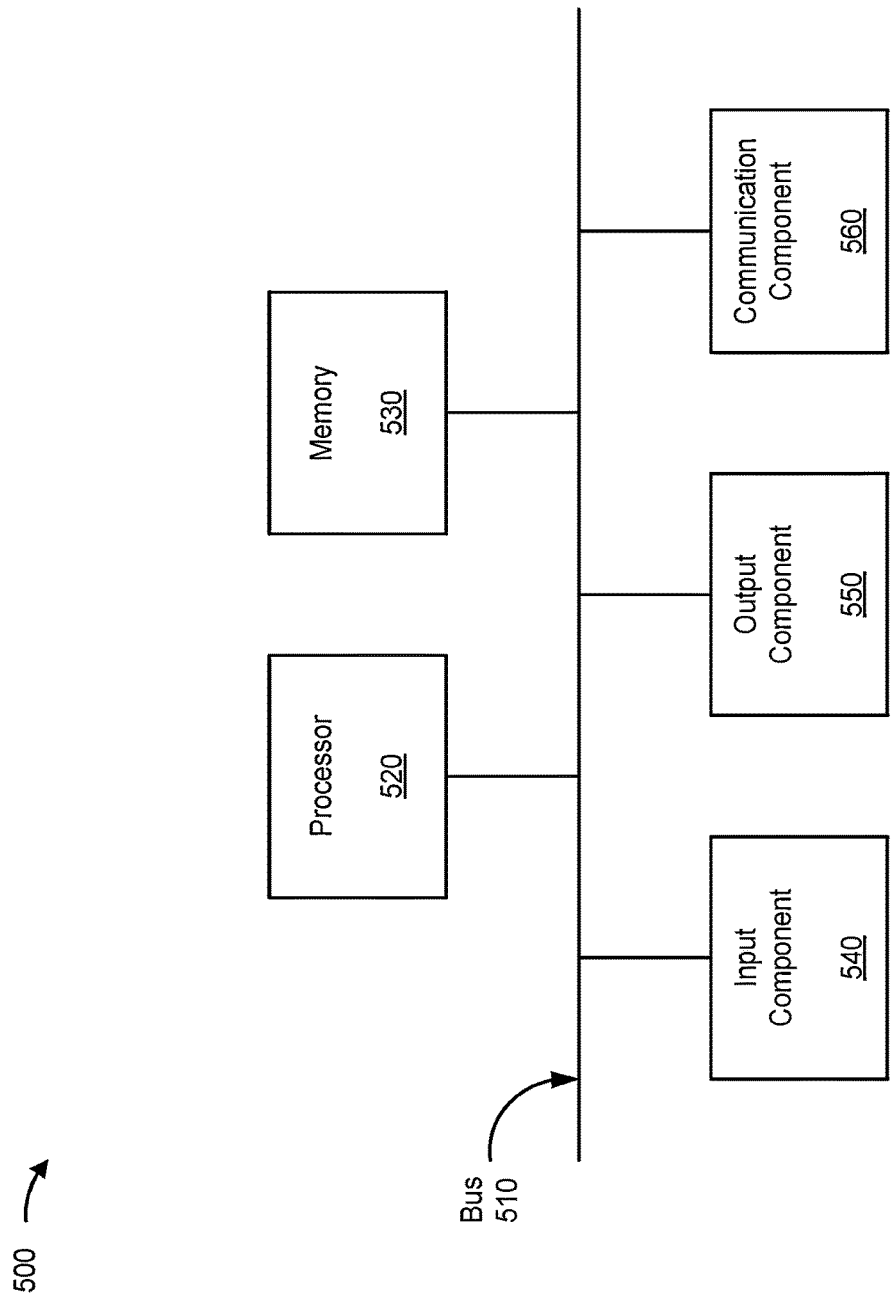
FIG. 5 is a diagram of example components of a device associated with artificial intelligence reparation characterization for erroneous artificial intelligence outputs, in accordance with some embodiments of the present disclosure.

FIG. 5 is a diagram of example components of a device 500 associated with AI reparation characterization for erroneous AI outputs. Device 500 may correspond to entity device 410, characterization system 420, and/or blockchain node(s) 430. In some implementations, entity device 410, characterization system 420, and/or blockchain node(s) 430 may include one or more devices 500 and/or one or more components of device 500. As shown in FIG. 5, device 500 may include a bus 510, a processor 520, a memory 530, an input component 540, an output component 550, and a communication component 560.

Bus 510 may include one or more components that enable wired and/or wireless communication among the components of device 500. Bus 510 may couple together two or more components of FIG. 5, such as via operative coupling, communicative coupling, electronic coupling, and/or electric coupling. For example, bus 510 may include an electrical connection, a wire, a trace, a lead, and/or a wireless bus. Processor 520 may include a central processing unit, a graphics processing unit, a microprocessor, a controller, a microcontroller, a digital signal processor, a field-programmable gate array, an application-specific integrated circuit, and/or another type of processing component. Processor 520 may be implemented in hardware, firmware, or a combination of hardware and software. In some implementations, processor 520 may include one or more processors capable of being programmed to perform one or more operations or processes described elsewhere herein.

Memory 530 may include volatile and/or nonvolatile memory. For example, memory 530 may include random access memory (RAM), read only memory (ROM), a hard disk drive, and/or another type of memory (e.g., a flash memory, a magnetic memory, and/or an optical memory). Memory 530 may include internal memory (e.g., RAM, ROM, or a hard disk drive) and/or removable memory (e.g., removable via a universal serial bus connection). Memory 530 may be a non-transitory computer-readable medium. Memory 530 may store information, instructions, and/or software (e.g., one or more software applications) related to the operation of device 500. In some implementations, memory 530 may include one or more memories that are coupled (e.g., communicatively coupled) to one or more processors (e.g., processor 520), such as via bus 510. Communicative coupling between a processor 520 and a memory 530 may enable the processor 520 to read and/or process information stored in the memory 530 and/or to store information in the memory 530.

Input component 540 may enable device 500 to receive input, such as user input and/or sensed input. For example, input component 540 may include a touch screen, a keyboard, a keypad, a mouse, a button, a microphone, a switch, a sensor, a global positioning system sensor, an accelerometer, a gyroscope, and/or an actuator. Output component 550 may enable device 500 to provide output, such as via a display, a speaker, and/or a light-emitting diode. Communication component 560 may enable device 500 to communicate with other devices via a wired connection and/or a wireless connection. For example, communication component 560 may include a receiver, a transmitter, a transceiver, a modem, a network interface card, and/or an antenna.

Device 500 may perform one or more operations or processes described herein. For example, a non-transitory computer-readable medium (e.g., memory 530) may store a set of instructions (e.g., one or more instructions or code) for execution by processor 520. Processor 520 may execute the set of instructions to perform one or more operations or processes described herein. In some implementations, execution of the set of instructions, by one or more processors 520, may cause the one or more processors 520 and/or the device 500 to perform one or more operations or processes described herein. In some implementations, hardwired circuitry may be used instead of or in combination with the instructions to perform one or more operations or processes described herein. Additionally, or alternatively, processor 520 may be configured to perform one or more operations or processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
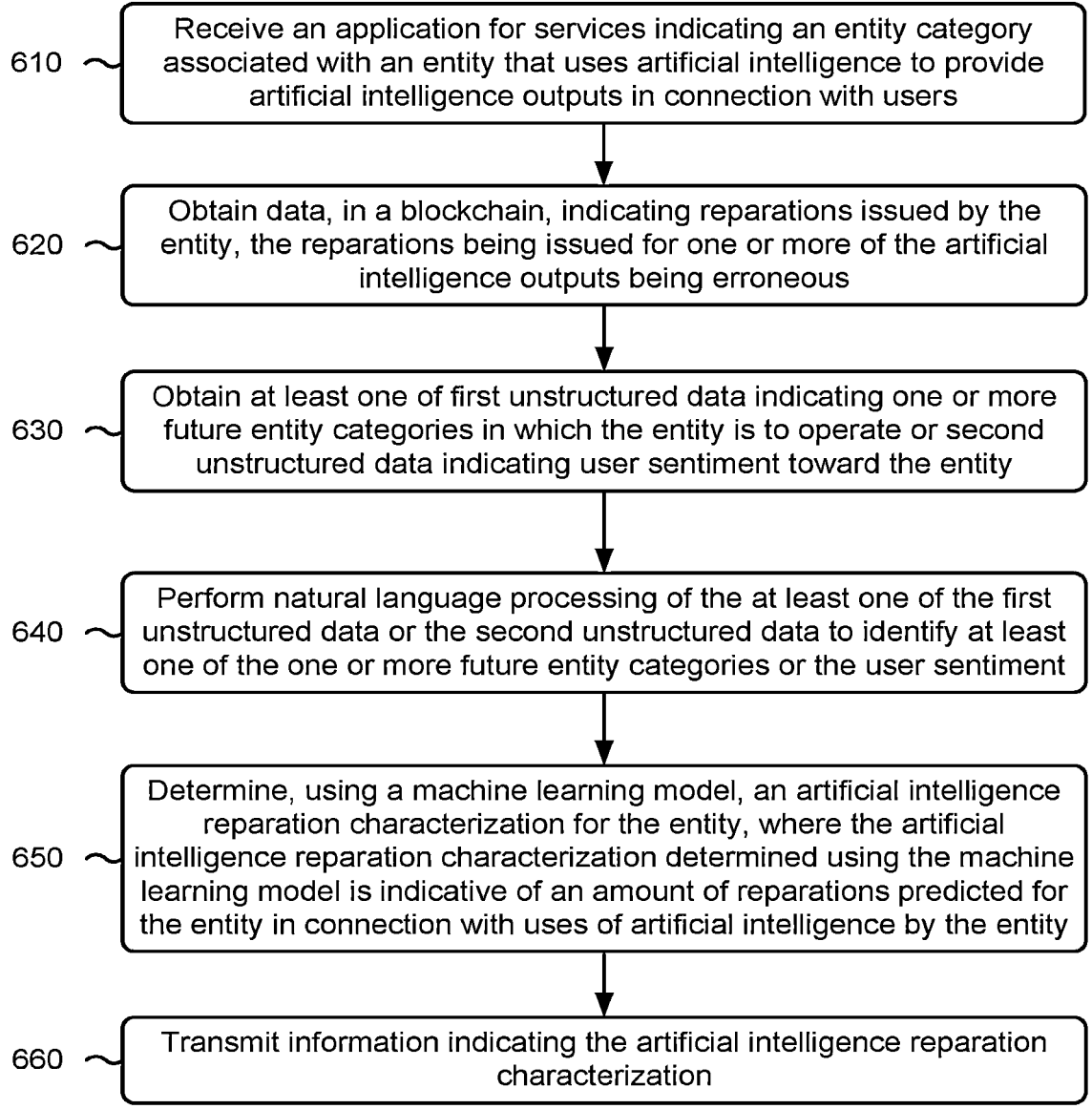
FIG. 6 is a flowchart of an example process associated with artificial intelligence reparation characterization for erroneous artificial intelligence outputs, in accordance with some embodiments of the present disclosure.

FIG. 6 is a flowchart of an example process 600 associated with AI reparation characterization for erroneous AI outputs. In some implementations, one or more process blocks of FIG. 6 may be performed by the characterization system 420. In some implementations, one or more process blocks of FIG. 6 may be performed by another device or a group of devices separate from or including the characterization system 420, such as the entity device 410 and/or one or more blockchain nodes 430. Additionally, or alternatively, one or more process blocks of FIG. 6 may be performed by one or more components of the device 500, such as processor 520, memory 530, input component 540, output component 550, and/or communication component 560.

As shown in FIG. 6, process 600 may include receiving an application for services indicating an entity category associated with an entity that uses artificial intelligence to provide artificial intelligence outputs in connection with users (block 610). For example, the characterization system 420 (e.g., using processor 520, memory 530, input component 540, and/or communication component 560) may receive an application for services indicating an entity category associated with an entity that uses artificial intelligence to provide artificial intelligence outputs in connection with users, as described above in connection with reference number 105 of FIG. 1A. As an example, the application for services may be for insurance services for the entity (e.g., to insurance against reparation payments made by the entity).

As further shown in FIG. 6, process 600 may include obtaining data, in a blockchain, indicating reparations issued by the entity, the reparations being issued for one or more of the artificial intelligence outputs being erroneous (block 620). For example, the characterization system 420 (e.g., using processor 520, memory 530, and/or communication component 560) may obtain data, in a blockchain, indicating reparations issued by the entity, the reparations being issued for one or more of the artificial intelligence outputs being erroneous, as described above in connection with reference number 110 of FIG. 1A. As an example, the reparations may have been issued by the entity to provide compensation for one or more automated outputs, reached by the entity in connection with one or more users, being erroneous.

As further shown in FIG. 6, process 600 may include obtaining at least one of first unstructured data indicating one or more future entity categories in which an entity is to operate or second unstructured data indicating user sentiment toward the entity (block 630). For example, the characterization system 420 (e.g., using processor 520 and/or memory 530) may obtain at least one of first unstructured data indicating one or more future entity categories in which the entity is to operate or second unstructured data indicating user sentiment toward the entity, as described above in connection with reference numbers 120 and 125 of FIG. 1B. As an example, the first unstructured data may include forward-looking statements published by the entity (e.g., in a Form 10-K), news articles, and/or blog posts, among other examples, and the second unstructured data may include social media posts, message board posts, blog posts, and/or news articles, among other examples.

As further shown in FIG. 6, process 600 may include performing natural language processing of the at least one of the first unstructured data or the second unstructured data to identify at least one of the one or more future entity categories or the user sentiment (block 640). For example, the characterization system 420 (e.g., using processor 520 and/or memory 530) may perform natural language processing of the at least one of the first unstructured data or the second unstructured data to identify at least one of the one or more future entity categories or the user sentiment, as described above in connection with reference number 130 of FIG. 1B. As an example, the characterization system may process a forward-looking statement published by the entity using natural language processing to identify a statement indicating a future intent to participate in a particular market segment, line of business, industry, or the like (e.g., "By 2024 our manufacturing operations will expand to medical devices.").

As further shown in FIG. 6, process 600 may include determining, using a machine learning model, an artificial intelligence reparation characterization for the entity, where the artificial intelligence reparation characterization determined using the machine learning model is indicative of an amount of reparations predicted for the entity in connection with uses of artificial intelligence by the entity (block 650). For example, the characterization system 420 (e.g., using processor 520 and/or memory 530) may determine, using a machine learning model, an artificial intelligence reparation characterization for the entity, where the artificial intelligence reparation characterization determined using the machine learning model is indicative of an amount of reparations predicted for the entity in connection with uses of artificial intelligence by the entity, as described above in connection with reference number 135 of FIG. 1C. As an example, the machine learning model may be trained to determine the artificial intelligence reparation characterization based on the data and the at least one of the one or more future entity categories or the user sentiment.

As further shown in FIG. 6, process 600 may include transmitting information indicating the artificial intelligence reparation characterization (block 660). For example, the characterization system 420 (e.g., using processor 520, memory 530, and/or communication component 560) may transmit information indicating the artificial intelligence reparation characterization, as described above in connection with reference number 140 of FIG. 1D. As an example, the information may indicate a risk category for the entity and/or an insurance premium amount for the entity.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 1A-1D. Moreover, while the process 600 has been described in relation to the devices and components of the preceding figures, the process 600 can be performed using alternative, additional, or fewer devices and/or components. Thus, the process 600 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of characterization for erroneous artificial intelligence outputs, comprising:

obtaining data indicating reparations issued by an entity that uses artificial intelligence to provide artificial intelligence outputs in connection with users, the reparations being issued for one or more of the artificial intelligence outputs being erroneous;

determining, using a machine learning model and based on one or more future entity categories in which the entity is to operate, an artificial intelligence reparation characterization for the entity, wherein the artificial intelligence reparation characterization determined using the machine learning model is indicative of an amount of reparations predicted for the entity in connection with uses of the artificial intelligence by the entity, wherein the machine learning model is trained to determine the artificial intelligence reparation characterization based on the data and the one or more future entity categories, and wherein a first node in an input layer of the machine learning model represents one or more historical reparations and a second node in the input layer of the machine learning model represents one or more user sentiments;

rejecting or approving, using the machine learning model, an application for services based on the artificial intelligence reparation characterization; and transmitting information indicating the artificial intelligence reparation characterization, wherein the information indicates an approval or a rejection of the application for services.

2. The method of claim 1, wherein the data is in a blockchain.

3. The method of claim 1, wherein the data further indicates one or more complaints made against the entity indicating that one or more automated outputs are erroneous.

4. The method of claim 1, wherein the information includes one or more of a risk category based on the artificial intelligence reparation characterization or a premium amount based on the artificial intelligence reparation characterization.

5. The method of claim 1, further comprising:
obtaining unstructured data indicating the one or more future entity categories; and
performing natural language processing of the unstructured data to identify the one or more future entity categories,
wherein the machine learning model is trained to determine the artificial intelligence reparation characterization further based on the one or more future entity categories.

6. The method of claim 1, further comprising:
obtaining unstructured data indicating the one or more user sentiments; and
performing natural language processing of the unstructured data to identify the one or more user sentiments,
wherein the machine learning model is trained to determine the artificial intelligence reparation characterization further based on the one or more user sentiments.

7. The method of claim 1, wherein the artificial intelligence reparation characterization comprises a score, a classification in a category, or a premium amount.

8. A system for characterization for erroneous artificial intelligence outputs, the system comprising:
one or more memories; and
one or more processors, communicatively coupled to the one or more memories, configured to:
obtain data indicating reparations issued by an entity that uses artificial intelligence to provide artificial intelligence outputs in connection with users, the reparations being issued for one or more of the artificial intelligence outputs being erroneous;
determine, using a machine learning model and based on one or more future entity categories in which the entity is to operate, an artificial intelligence reparation characterization for the entity, wherein the artificial intelligence reparation characterization determined using the machine learning model is indicative of an amount of reparations predicted for the entity in connection with uses of the artificial intelligence by the entity, wherein the machine learning model is trained to determine the artificial intelligence reparation characterization based on the data and the one or more future entity categories, and wherein a first node in an input layer of the machine learning model represents one or more historical reparations and a second node in the input layer of the machine learning model represents one or more user sentiments;

determine, based on the artificial intelligence reparation characterization, information that is to be used to populate a document for the entity;

generate the document with the information populated in the document;

reject or approve, using the machine learning model, an application for services based on the artificial intelligence reparation characterization; and transmit information indicating the artificial intelligence reparation characterization, wherein the information indicating the artificial intelligence reparation characterization indicates an approval or a rejection of the application for services.

9. The system of claim 8, wherein the data is in a blockchain.

10. The system of claim 8, wherein the data further indicates additional reparations issued by one or more other entities.

11. The system of claim 10, wherein the entity and the one or more other entities are associated with a same entity category.

12. The system of claim 8, wherein the one or more processors are further configured to:
obtain unstructured data indicating the one or more future entity categories; and
perform natural language processing of the unstructured data to identify the one or more future entity categories,
wherein the machine learning model is trained to determine the artificial intelligence reparation characterization further based on the one or more future entity categories.

13. The system of claim 8, wherein the one or more processors are further configured to:
obtain unstructured data indicating the one or more user sentiments toward the entity; and
perform natural language processing of the unstructured data to identify the one or more user sentiments,
wherein the machine learning model is trained to determine the artificial intelligence reparation characterization further based on the one or more user sentiments.

14. The system of claim 8, wherein the one or more processors are further configured to:
receive the application for services, the application for services indicating an entity category associated with the entity,
wherein the one or more processors are configured to obtain the data based on receiving the application for services.

15. The system of claim 8, wherein the document is a policy document.

16. A non-transitory computer-readable medium storing a set of instructions for characterization for erroneous artificial intelligence outputs, the set of instructions comprising:
one or more instructions that, when executed by one or more processors of a device, cause the device to:
receive an application for services, the application for services indicating an entity category associated with an entity that uses artificial intelligence to provide artificial intelligence outputs in connection with users;

obtain data, in a blockchain, indicating reparations issued by the entity, the reparations being issued for one or more of the artificial intelligence outputs being erroneous;

obtain at least one of first unstructured data indicating one or more future entity categories in which the entity is to operate or second unstructured data indicating one or more user sentiments toward the entity;

perform natural language processing of the at least one of the first unstructured data or the second unstructured data to identify at least one of the one or more future entity categories or the one or more user sentiments;

determine, using a machine learning model and based on the one or more future entity categories, an artificial intelligence reparation characterization for the entity, wherein the artificial intelligence reparation characterization determined using the machine learning model is indicative of an amount of reparations predicted for the entity in connection with uses of the artificial intelligence by the entity, and wherein the machine learning model is trained to determine the artificial intelligence reparation characterization based on the data and the one or more future entity categories, and wherein a first node in an input layer of the machine learning model represents one or more historical reparations and a second node in the input layer of the machine learning model represents the one or more user sentiments;

reject or approve, using the machine learning model, the application for services based on the artificial intelligence reparation characterization; and transmit information indicating the artificial intelligence reparation characterization, wherein the information indicates an approval or a rejection of the application for services.

17. The non-transitory computer-readable medium of claim 16, wherein the machine learning model is trained to determine the artificial intelligence reparation characterization based on the data, the one or more future entity categories, and the one or more user sentiments.

18. The non-transitory computer-readable medium of claim 16, wherein the artificial intelligence reparation characterization comprises a score, a classification in a category, or a premium amount.

19. The non-transitory computer-readable medium of claim 16, wherein the data further indicates additional reparations issued by one or more other entities.

20. The non-transitory computer-readable medium of claim 19, wherein the entity and the one or more other entities are associated with a same entity category.

* * * * *